(No Model.) 2 Sheets—Sheet 1.

J. A. WEBBER.
CORN HUSKING MACHINE.

No. 327,042. Patented Sept. 29, 1885.

Witnesses:
J. Staib
Chas. H. Smith

Inventor:
Josiah A. Webber
per Lemuel W. Serrell atty (No Model.) 2 Sheets—Sheet 2.
J. A. WEBBER.
CORN HUSKING MACHINE.
No. 327,042. Patented Sept. 29, 1885.
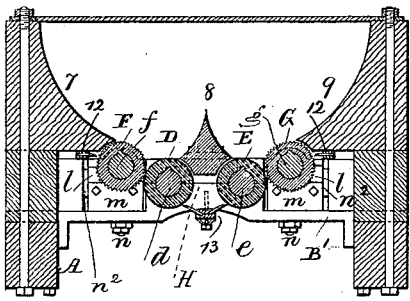
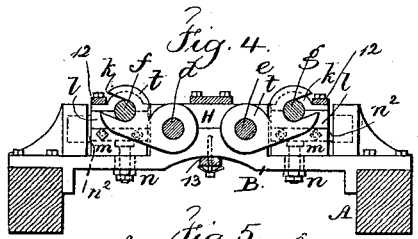
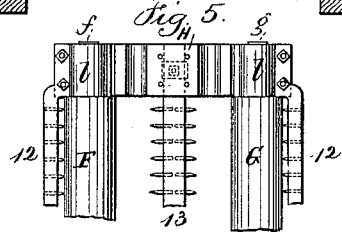
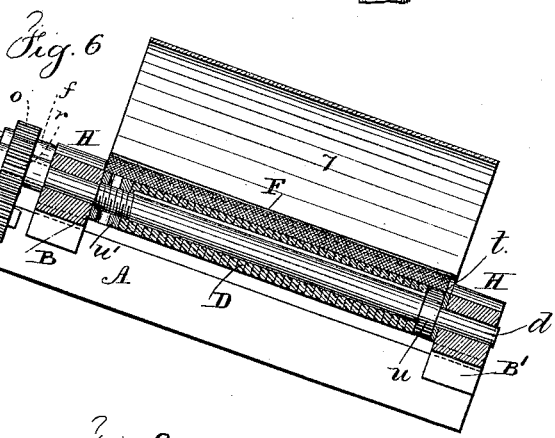
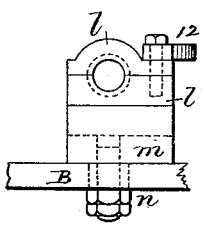
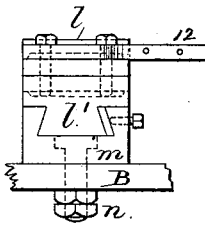
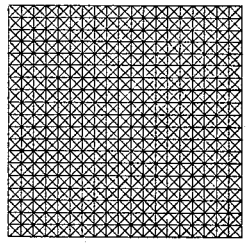
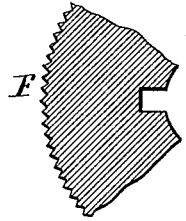
Witnesses:
J. Staib
Chas H. Smith
Inventor
Josiah A. Webber
per Lemuel W. Serrell, Atty

UNITED STATES PATENT OFFICE.

JOSIAH A. WEBBER, OF BROOKLYN, ASSIGNOR, BY MESNE ASSIGNMENTS, TO CHARLES F. HAWKINS, OF GOSHEN, NEW YORK.

CORN-HUSKING MACHINE.

SPECIFICATION forming part of Letters Patent No. 327,042, dated September 29, 1885.

Application filed September 30, 1884. (No model.)

*To all whom it may concern:*

Be it known that I, JOSIAH A. WEBBER, of Brooklyn, in the county of Kings and State of New York, have invented an Improvement in Corn-Husking Machines, of which the following is a specification.

I make use of two pairs of rollers geared together and placed at an inclination, so that the ears of corn run down upon such rollers as the husks are pulled off.

In corn-husking machines of this general character that have heretofore been made difficulty has been experienced in obtaining rollers that are adapted to loosen, grasp, and pull off the husks, and that are not rapidly worn out. Metallic rollers, although made with rough surfaces, become smooth and polished, so that the ears of corn slide down the same without being husked, and with rollers having rubber or partially-rubber surfaces the rubber is rapidly cut away by the flinty surfaces of the husks and the rollers become useless.

In my corn-husker I employ, in connection with the other parts, rollers composed of perforated leather disks upon metal shafts, and peculiarly-constructed bearings for the journals of the rolls, all as hereinafter described and claimed.

Figure 2:
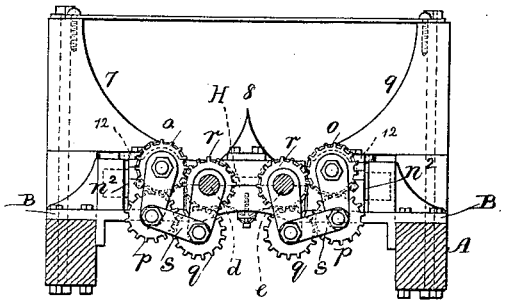
Figure 1:
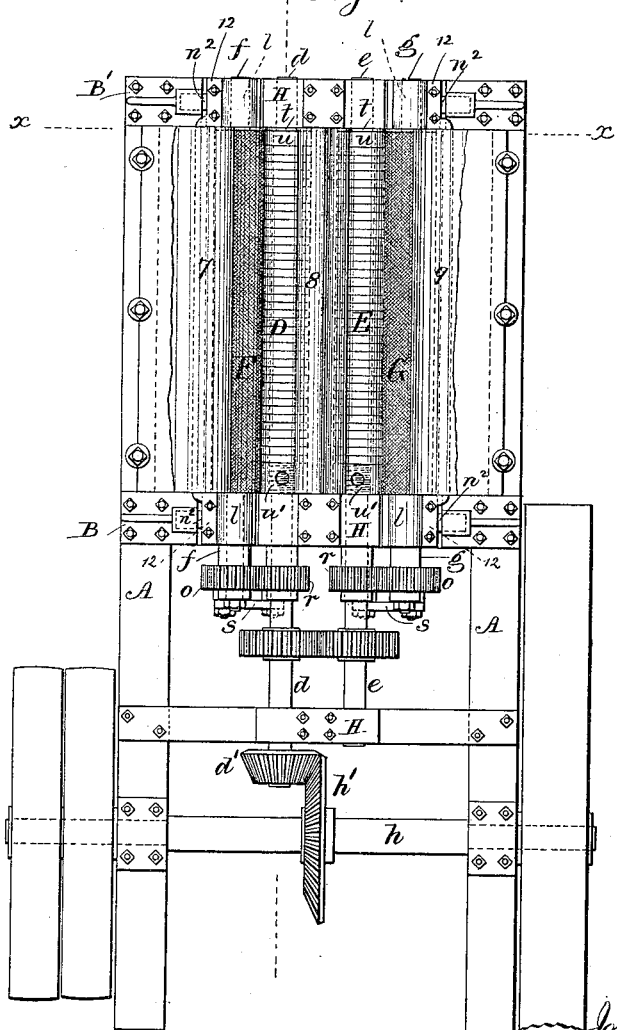

In the drawings, Figure 1 is a plan view of the rollers and their bearings perpendicularly to the axes of the rollers, the cover over the rollers being removed. Fig. 2 is an end view of the gearing to connect the rollers. Fig. 3 is a cross-section through the rollers. Fig. 4 is a view of the throat-plate and journal-boxes sectionally of the shafts, and on the line $x\,x$, Fig. 1. Fig. 5 is a plan of the bearings and lower ends of the outer rollers and of the bars and pins. Fig. 6 is a section longitudinally of the machine, showing the leather rings of one roller in section. Fig. 7 shows the side and end of one of the movable journal-boxes. Fig. 8 is a section of part of one metal roller in larger size. Fig. 9 shows part of the surface of the same as laid out flat. Fig. 10 shows one of the leather disks.

The frame of the machine is to be of any desired character. Its side bars, A, are to be at the usual inclination; and B B' are the cross bearing-frames for the journal-boxes of the range of inclined husking-rollers.

The shafts $d\,e$ of the rollers D E are longer than the shafts of the rollers F G, and these shafts $d\,e$ are geared together, and they are supported in the stationary bearings or journal-boxes H H upon the cross-bearers B B'.

The shaft $d$ receives its motion from the bevel-gear $d'$, shaft $h$, and bevel-gear $h'$. This shaft $h$ is rotated by competent power, and the gearing and shafts as thus far described are the same as have before been made use of.

The shafts $f$ and $g$ of the rollers F G are received into the bearing-boxes $l$, each one of which is made with a dovetail base, $l'$, sliding endwise in the block $m$, the bottom of which rests upon the cross-bearer B or B', and is secured thereto by a bolt and nut, $n$, the bolt passing down through the block $m$ and the bearer B or B', so that the parts are held in place; but the boxes may turn slightly upon this bolt, as the boxes may be moved by the roller being sprung or moved more at one end than the other by the passage of a bunch of husks through between the rollers. The dovetail bases $l'$ of the journal-boxes $l\,l$ slide back and forth within and upon the base-blocks $m$; and springs of rubber, $n^2$, or other suitable material, are made use of in pressing the rollers F G toward the rollers D E. These springs $n^2$ are sustained by sockets upon the bearers B or B'. By this construction the journals of the rollers are properly supported, and freedom of lateral motion is obtained without the risk of the journals cutting in their bearings or becoming loose or hot.

The pairs of husking-rollers are geared together by the gearing $o\,p\,q\,r$. The gears $p$ and $q$ are intermediate, and their gudgeons or axes are held by the links $s$, so that the rollers will always receive a positive movement, even when the gears $o$ and $r$ are separated.

As the husks and ears of corn slide down upon the pairs of rollers there is a risk of accumulation between the stationary journal-boxes H on the bearers B' and the moving journal-boxes $l$. To prevent this I make use of a throat-plate, $t$, Figs. 1, 4, and 6, between the lower ends of each pair of rollers and the surface of the lower bearings, H $l$. Each throat-plate has a hole for the journal of the roller D or E, and an open slot for the journal of the rollers F or G, so that such throat-plates are held in place and do not interfere with the lateral movements of the rollers, and the V-notch in the edge of each throat-plate forms a guide as the husks and silk are drawn down by the rollers, and at the same time such materials are kept out of the space between the journal-boxes H and I, and hence do not become wedged into such space, and there is nothing to prevent the proper movement of the yielding journal-boxes and rollers.

Each roller, or one of each pair of rollers, is made with a compressed leather surface composed of a number of leather disks compressed together upon a shaft. The leather-surfaced roller is made as follows: I make the roller-shaft with the stationary collar $u$ larger than the shaft and slightly smaller in circumference than the roller when completed. This collar $u$ is near the lower bearing of the shaft, and there is a follower or collar, $u'$, near the upper bearing, and a key or feather running along the length of the shaft. The leather surface is made by cutting the leather into the form of rings all of one size, and each provided with a notch or seat to receive the key or feather of the shaft, as shown in Fig. 10. The disks are put on the shaft, either with or without cement between them, and firmly compressed between plates in a powerful press—such as a hydraulic press—which forms them into a compact mass, after which the follower $u'$ is applied and secured in place by a rivet or pin, or by a nut screwed upon the shaft.

These leather-surfaced rollers are employed either in pairs or as one roller in each pair of husking-rollers, the other roller in each pair, by preference, being of steel and having a surface of pyramidal points, as shown in Fig. 9, or of points formed by cutting screw-threads upon the surface, there being one, two, or more threads that cross each other in consequence of being cut as right and left handed threads. This insures the loosening and pulling off of the husks in consequence of the adhesive character of the leather and the roughness in the surface of the metal roller.

The longitudinal guides 7 8 9 are applied at the outer sides and between the pairs of rollers, to form with the roller-bottoms troughs down which the ears pass as the husks are pulled off.

I also make use of the longitudinal side bars, 12 12, and central bar, 13, with steel pins in the edges next to the rollers, which pins project, and their points are in close proximity to the surfaces of the rollers, for the purpose of loosening the husks and preventing any accumulation by the wrapping of the husks around the rollers.

I claim as my invention—

1. The combination, with the corn-husking rollers, of the stationary bearings for the shaft of one roller in each pair of rollers, and the sliding bearings for the journals of the other roller, and a base for each sliding bearing, and a bolt or pivot connecting such base to the cross-bar, whereby the bearing is allowed to turn upon the bolt as well as to slide endwise, substantially as set forth.

2. The combination, with the pair of husking-rollers, of bearings for the shafts of the rollers, one set of such bearings being adapted to slide, and a throat-plate having a V-notch in one side and occupying a position between the ends of the pair of rollers and the bearings, substantially as set forth.

3. The combination, in a corn-husking machine, of two pairs of rollers, one roller in each pair having perforated disks of leather upon a metal shaft and secured substantially as described, throat-plates, one to each pair, yielding bearings for the journals of one roller in each pair, and the gearing to rotate all the rollers, substantially as set forth.

In testimony that I claim the foregoing as my invention I have signed my name, in presence of two witnesses, this 19th day of September, 1884.

JOSIAH A. WEBBER.

Witnesses:
 GEO. BRUSH,
 JOHN WILDE.